No. 842,242. PATENTED JAN. 29, 1907.
T. E. R. PHILLIPS.
SCREW.
APPLICATION FILED AUG. 19, 1905.
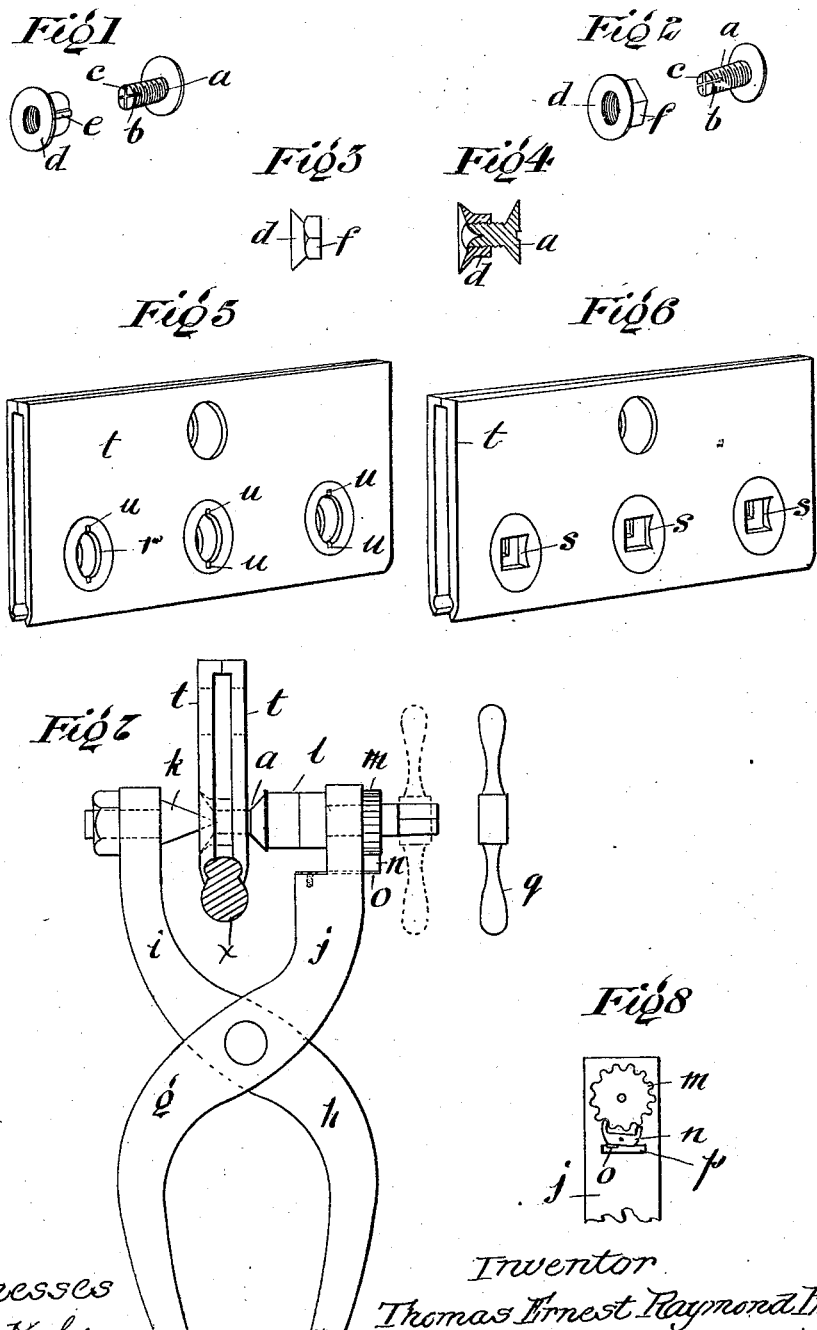
Witnesses
JKM Kuehne
John A. Percival
Inventor
Thomas Ernest Raymond Phillips
by Richards
Attorneys

UNITED STATES PATENT OFFICE.

THOMAS ERNEST RAYMOND PHILLIPS, OF LONDON, ENGLAND.

SCREW.

No. 842,212. Specification of Letters Patent. Patented Jan. 29, 1907.

Application filed August 19, 1905. Serial No. 274,937.

*To all whom it may concern:*

Be it known that I, THOMAS ERNEST RAYMOND PHILLIPS, a subject of His Majesty the King of Great Britain, and a resident of 11 and 12 Finsbury Square, in the county of London, E. C., England, have invented certain new and useful Improvements in and in Connection with Riveting-Tools, (for which I have made application for patent in Great Britain, No. 18,186, dated August 22, 1904,) of which the following is a specification.

This invention has reference to a new and improved riveting-tool for use with a construction of screw and nut of the kind illustrated, and has for its object to provide that two or more disconnected parts may be simultaneously fastened by the mere operation of turning the screw by means of the tool, one purpose to which the tool is particularly directed being for expeditiously and securely fixing the trolley-wire or conductor of electric traction systems in mechanical clips or ears constructed according to the invention forming the subject-matter of my previous application for patent, Serial No. 272,273, filed August 1, 1905.

In order that my invention may be readily and clearly understood, I have hereunto appended a sheet of drawings, whereof—

Figures 1 and 2 are perspective views of a screw and slightly different nuts for use with which the tool according to this invention is designed. Fig. 3 is a side view of a nut made as shown in Fig. 2. Fig. 4 is a sectional view of a nut with the screw shown fixed therein. Figs. 5 and 6 are perspective views of the plates for gripping the trolley-wire as set out in my previous application for patent aforesaid. Fig. 7 is a side elevation of the tool forming the present invention and illustrates how the said tool is utilized for fixing together the plates referred to by the screws and nuts shown in Figs. 1 or 2. Fig. 8 is a detail view hereinafter described.

The fastening means to which my invention is designed consists of a screw, such as $a$, having at the opposite end to the head preferably two slits $b$ and $c$ at right angles to each other, or I remove the central portion of the screw for a suitable distance, and in connection with such screw a bell-shaped nut $d$, internally threaded, (parallel or tapered,) for screwing onto the slitted end of the screw, and either provided, as shown in Fig. 1, with one or more webs $e$ or arranged with a squared or other angular-shaped part $f$, as shown in Fig. 2.

According to my invention the riveting-tool comprises a pair of pivotally-connected members $g$ $h$, the ends $i$ $j$ of which have renewably fixed thereto engaging devices $k$ and $l$, whereof the former, $k$, is pointed for insertion into the slitted end of the screw $a$, and the latter, $l$, in the example shown is formed, like the end of a screw-driver, for engaging the head of such screw. Obviously, however, the form of the device $l$ may vary according to the formation of the screw-head.

Although not imperative, I prefer to arrange the screw-head-engaging device $l$ in connection with a ratchet and pawl for actuating the same. As shown in Figs. 7 and 8, I may effect this by mounting on the outer end of the member $l$ a ratchet-wheel $m$ and pivoting beneath same to the member $g$ a double pawl, such as $n$, under the influence of a spring $o$, fixed to $j$, as in Fig. 7, and passing through a slot $p$, formed therein, so that according to the direction it is desired to rotate the device $l$ such spring $o$ is located at one or the other side of the pawl $n$. As shown in dotted outline in Fig. 7, I may, however, arrange to rotate the screw-head-engaging device by way of a key or the like $q$.

In operation the screw $a$ is passed through alining planes and may be countersunk holes—such as $r$ or $s$, Figs. 5 and 6—in two portions of work, such as $t$ $t$, and then by means of the tool, Fig. 7, be screwed in the bell-shaped nut $d$, which is prevented from moving by the web or webs $e$ or square or other angular part $f$, respectively engaging the slots $u$, Fig. 5, or the square or other angular holes $s$, Fig. 6.

Simultaneously with the final turning movements imparted to the screw it is riveted by pressing the outer ends of the members $g$ $h$ of the tool, Fig. 7, so as to force the slitted end of the screw out into the recessed part of the nut, as at Fig. 4.

Apart from its more general applications my invention is more particularly devised for use in connection with the mechanical ear or clip for supporting electric trolley-wires described in my application previously referred to and which briefly consists of a bar of U-section having removably connected thereto one or more pairs of plates or clips adapted to be drawn together to suitably grip a trolley-wire.

Figs. 5 and 6 are examples of such plates or clips forming part of the mechanical ear referred to, and Fig. 7 illustrates how the screw $a$ and nut $d$ are employed in conjunction with the tool described herein to draw and rivet the plates together in the manner set forth for quickly and efficiently securing the trolley-wire $x$ therebetween, while notwithstanding the riveting action secured a reverse operation of the tool will effect the withdrawal of the screws, if required.

Having now described my invention, what I desire to secure by Letters Patent is—

A riveting-tool for use in connecting and riveting two or more portions of work by means of a screw and nut of the kind described, said tool comprising a pair of pivotally-connected members, engaging devices mounted in the one end of said devices for engaging the screw and nut and means for controlling one of said devices consisting of a ratchet-wheel $m$ pawl $n$ and a spring $o$ substantially as described.

In witness whereof I have hereunto set my hand in presence of two witnesses.

THOMAS ERNEST RAYMOND PHILLIPS.

Witnesses:
ALBERT GEORGE BARNES,
LEONARD COULSON.